United States Patent [19]

Inoue et al.

[11] Patent Number: 5,057,959
[45] Date of Patent: Oct. 15, 1991

[54] THIN-FILM MAGNETIC HEAD HAVING SUBSTRATE FORMED OF CRYSTALLIZED GLASS

[75] Inventors: Shinichi Inoue; Kenji Makino; Tooru Matuda, all of Kanagawa; Fujihiro Itoh, Saitama; Yutaka Kusano, Kanagawa, all of Japan

[73] Assignee: Canon Kabushiki Kaisha, Tokyo, Japan

[21] Appl. No.: 499,653

[22] Filed: Mar. 27, 1990

[30] Foreign Application Priority Data

Mar. 30, 1989 [JP] Japan .................................. 1-076432

[51] Int. Cl.$^5$ ........................ G11B 5/147; B32B 17/06
[52] U.S. Cl. ...................................... 360/126; 428/900
[58] Field of Search ........................ 360/126; 428/900

[56] References Cited

U.S. PATENT DOCUMENTS 4,422,117 12/1983 Nomura et al. ..................... 360/126
4,894,742 1/1990 Saito et al. ........................... 360/126

Primary Examiner—A. J. Heinz
Assistant Examiner—Jefferson Evans
Attorney, Agent, or Firm—Robin, Blecker, Daley & Driscoll

[57] ABSTRACT

A thin-film magnetic head having a magnetic core formed by a thin-film deposition technique on a substrate formed of crystallized glass which comprises of a mass of microcrystalline aggregation particles having an average particle size of 1 to 10 μm and each comprising of an aggregation of microcrystalline grains having an average grain size of about 0.5 μm or smaller. This structure enables an improvement in the abrasion resistance of the head and, hence, an improvement in the recording/reproduction characteristics while maintaining the desired workability of the substrate, thereby improving the head in producibility and reliability.

7 Claims, 2 Drawing Sheets

10μm

10μm

10μm though these come into contact with a magnetic recording medium, because the particle size of the aggregation particles is small. The substrate is therefore free from the problem of the recording medium being worn by the aggregation particles.

THIN-FILM MAGNETIC HEAD HAVING SUBSTRATE FORMED OF CRYSTALLIZED GLASS

BACKGROUND OF THE INVENTION

1. Field of the Invention

This invention relates to a thin-film magnetic head in which a magnetic circuit constituted by thin films is formed on a substrate and, more particularly, to a thin-film magnetic head having a substrate formed of crystallized glass.

2. Description of the Related Art

Thin-film magnetic heads are manufactured by using the thin-film forming technique and the photo-lithographic etching method in such a manner that a magnetic core constituted by magnetic films and a coil constituted by conductive films are formed on a substrate with insulation layers interposed between the magnetic films and the conductive films, and a protective layer or plate is provided on these layers. If a thin-film magnetic head of this construction is used, an extremely small track width can be set. The practical application of this kind of magnetic head is, therefore, expected with the recent development of high-density magnetic recording systems. Some thin-film magnetic heads of this kind have already been developed as articles of commerce to be used in external storage units for computers or to be used as heads for still video apparatus.

Conventionally, ferrite and alumina have been used as materials for forming substrates for thin-film magnetic heads. Ferrite has improved workability and good characteristics in terms of sliding on the recording medium and is superior in durability. However, since the thermal expansion coefficient of ferrite is generally smaller than that of the magnetic material of magnetic thin films constituting the magnetic core of the thin-film magnetic head, there is a risk of separation of the magnetic films of the magnetic core owing to an increase in film stress, if the thickness of the magnetic films is several microns or larger. In addition, because it is difficult to form a large-diameter substrate, the producibility of the substrate is low. There is also a problem in terms of characteristics, i.e., occurrence of large sliding noise.

The use of alumina entails a problem of its very large hardness, that is, it is inferior in workability.

In recent years, crystallized glass has been noted as a material for the substrate. Crystallized glass can be freely changed in thermal expansion coefficient, hardness, crystal grain size and so on and, therefore, has a wide range of application. Specifically, the influence of the crystal grain size on the photo-lithographic etching working accuracy and on the occurrence of chipping or break during mounting process of the head is large. In consideration of this, a type of crystallized glass is widely used recently which consists of an aggregation of microcrystalline grains having very small grain size (about 0.2 to 0.5 μm), as shown in a schematic illustration of an enlarged photography shown in FIG. 5.

However, if a magnetic recording medium contacts and slides on a thin-film magnetic head having a substrate formed of such crystallized glass for a long time, the microcrystalline grains of the substrate are chipped off by sliding friction between the head and the recording medium, and the substrate is worn fast. That is, the abrasion resistance of the head is small. Another problem is encountered which resides in that chipped-off microcrystalline grains are attached to the surface of the magnetic head sliding on the recording medium to cause spacing losses, resulting in deterioration in recording/reproduction characteristics of the head.

SUMMARY OF THE INVENTION

It is an object of the present invention to solve the above-described problems.

It is another object of the present invention to improve the abrasion resistance of a thin-film magnetic head having a substrate formed of crystallized glass as well as to improve the recording/reproduction characteristics.

To these ends, the present invention provides in one of its aspects a thin-film magnetic head comprising: a substrate; and a magnetic core formed on the substrate, the magnetic core being constituted by magnetic thin films, wherein the substrate is formed of crystallized glass containing a multiplicity of microcrystalline aggregation particles having an average particle size of 1 to 10 μm and each being formed of an aggregation of microcrystalline grains having an average grain size of about 0.5 μm or smaller.

These and other objects and features of the present invention will become clear upon reading the following detailed description of an embodiment of the present invention taken in conjunction with the accompanying drawings.

DETAILED DESCRIPTION OF THE PREFERRED EMBODIMENT

An embodiment of the present invention will be described below in detail with reference to the accompanying drawings.

Figure 1:
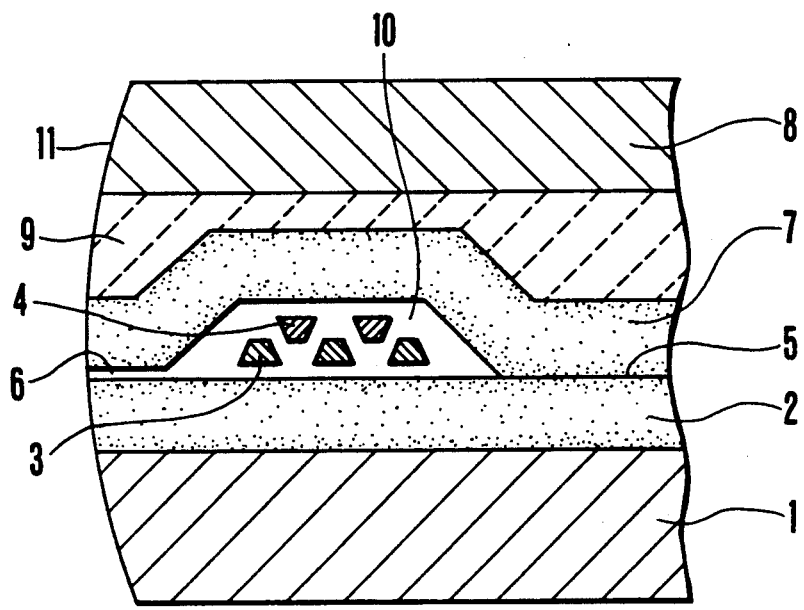
FIG. 1 is a cross-sectional view of a thin-film magnetic head which represents an embodiment of the present invention, showing essential portions of the same.

FIG. 1 shows in section the structure of a thin-film magnetic head which represents an embodiment of the present invention. A surface of this head on the left hand side of FIG. 1 serves as a medium slide surface 11 which is made to slide on an unillustrated magnetic recording medium.

The thin-film magnetic head shown in FIG. 1 has a substrate 1 formed of crystallized glass containing alumina silicate glass or lithium silicate glass as a main component. The features of the substrate 1 will be described later.

A lower magnetic layer 2 and an upper magnetic layer 7 are formed as thin films on the substrate 1 to constitute a magnetic core. The magnetic layers 2 and 7 are formed of a magnetic material such as Sendust. Front end portions of the lower and upper magnetic layers 2 and 7 constituting a part of the medium slide surface 11 face each other with a magnetic gap 6 interposed therebetween. The magnetic gap 6 is defined by an insulation layer formed of a material such as $SiO_2$. Rear end portions of the lower and upper magnetic layers 2 and 7 are connected to each other with magnetic contact holes 5 interposed therebetween.

Intermediate portions of the magnetic layers 2 and 7 are spaced apart from each other with an insulation layer 10 interposed therebetween. The insulation layer 10 is formed of a material such as $SiO_2$. Thin-film conductive layers 3 and 4 formed of Al or Cu and constituting a coil and lead electrodes are provided in the insulation layer 10. The insulation layer 10, whose details are not shown in the drawings, consists of a plurality of layers between which the conductive layers 3 and 4 are arranged.

A protective plate 8 is bonded to the upper surface of the upper magnetic layer 7 with a bonding agent 9. The protective plate 8 is formed of the same crystallized glass as the substrate 1.

A process of manufacturing a thin-film magnetic head of this construction will now be described below. First, the lower magnetic layer 2 is formed on the substrate 1 by the sputtering and is then formed into a predetermined pattern by the photo-lithographic etching.

Next, an insulation layer is formed on the lower magnetic layer 2, and the conductive layer 3 is formed thereon and is then formed by the photo-lithographic etching into a pattern for constituting a coil and lead electrodes.

Another insulation layer is formed on this pattern, contact holes (not shown) through which portions of the conductive layer 3 are exposed are formed in this insulation layer, and the conductive layer 4 is formed on this insulation layer and is formed into a pattern for constituting the coil and the lead electrodes. In the example shown in FIG. 1, the conductive layer 3 constitutes three turns while the conductive layer 4 constitutes two turns, thereby constituting a coil having five turns.

Another insulation layer is formed on the conductive layer 4, magnetic contact holes 5 are formed in this insulation layer, and a non-magnetic layer defining the magnetic gap 6 is formed on the magnetic recording medium slide surface side.

The upper magnetic layer 7 is formed thereon and is formed into a predetermined pattern by the photo-lithographic etching.

The protective plate 8 is bonded to the upper magnetic layer 7 with the bonding agent 9. The whole of these layers is thereafter cut to be divided into the respective head chips, and the medium slide surface 11 is worked, thereby completing a thin-film magnetic head.

Figure 2:
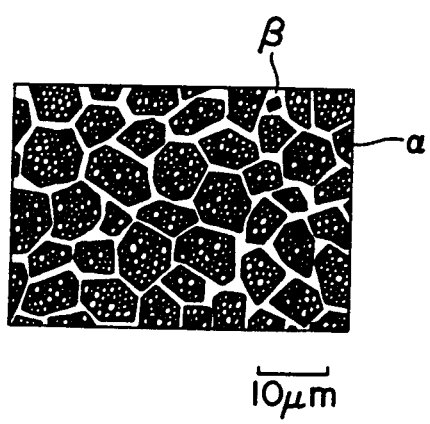
FIG. 2 is a schematic diagram of an enlarged photograph of crystallized glass used as the material of a substrate shown in FIG. 1, showing features of the same.

The crystallized glass forming the substrate 1 and the protective plate 8 of the head in accordance with this embodiment is different form those used in the conventional art; it has a crystalline structure such as that shown in FIG. 2. FIG. 2 is a schematic illustration based on a photograph of the crystallized glass in accordance with the present invention. Very small round figures in FIG. 2 represent microcrystalline grains having an average diameter of about 0.5 $\mu$m or smaller (about 0.2 to 0.5 $\mu$m). This crystallized glass is characterized in that such microcrystalline grains aggregate to form microcrystalline aggregation particles (hereinafter referred to as clusters) $\alpha$ having an average diameter of about 1 to 10 $\mu$m, and that the clusters $\alpha$ are separated from each other by a phase $\beta$ consisting of a vitreous (amorphous) body. If each cluster $\alpha$ consisting of an aggregation of microcrystalline grains is regarded as a crystalline phase, the glass (amorphous) phase $\beta$ formed between the clusters $\alpha$ corresponds to a crystal grain boundary. Thus, the crystallized glass used for the substrate 1 and the protective plate 8 of this embodiment consists of an aggregation of clusters $\alpha$. In a process of producing crystallized glass containing alumina silicate glass or lithium silicate glass as a main component, suitable processing conditions may be set for the crystallization step based on heat treatment, thereby enabling crystallization of clusters $\alpha$.

Figure 3:
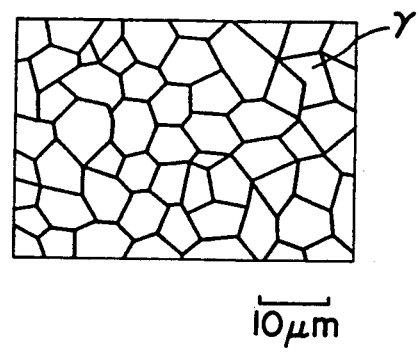
FIG. 3 is a schematic diagram of an enlarged photograph of ferrite used as a material of a substrate for a conventional thin-film magnetic head.

The reason for the use of such crystallized glass will be described below. The inventors of the present invention noticed the improved abrasion resistance of a thin-film magnetic head in which a ferrite substrate is used, and thought that it might be attributable to the size of ferrite grains. Polycrystalline Ni-Zn ferrite used for the substrate of the conventional thin-film magnetic head has a crystalline structure such as that shown in a schematic illustration of an enlarged photograph of FIG. 3. That is, the ferrite consists of aggregations of crystalline grains $\gamma$ having an average diameter of 1 to 10 $\mu$m. The crystalline structure of crystallized glass is different from the structure shown in FIG. 3, but can be made similar to the same by crystallizing clusters $\alpha$ as shown in FIG. 2. That is, in the crystallized glass used for the substrate of the thin-film magnetic head of the present invention, clusters $\alpha$ are crystallized each of which has a size generally equal to that of the crystalline grains $\gamma$ of the polycrystalline ferrite used for thin-film magnetic heads.

It is possible to improve the abrasion resistance of the crystallized glass by crystallizing 1 to 10 $\mu$m clusters therein. It is, therefore, possible for the thin-film magnetic head having the substrate 1 formed of this crystallized glass to be improved in abrasion resistance, thereby preventing microcrystalline grains of the crystallized glass from being chipped off the substrate 1 by slide friction with the recording medium. The recording/reproduction characteristics of the head can, therefore, be improved.

Figure 4:
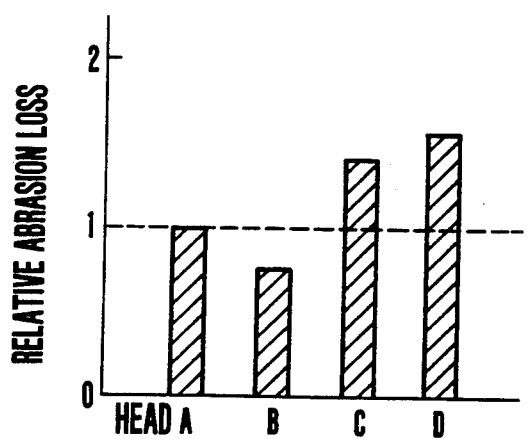
FIG. 4 is a graph showing the results of a test of the abrasion resistance of the head of the invention and conventional heads.
Figure 5:
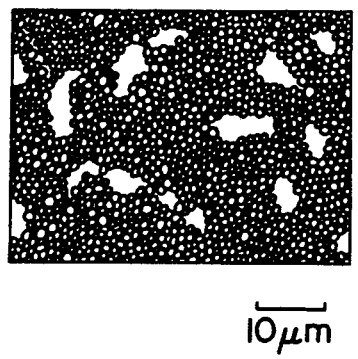
FIG. 5 is a schematic diagram of an enlarged photograph of crystallized glass used as a material of a substrate for a conventional thin-film magnetic head.

FIG. 4 shows the results of a test of the abrasion resistances of a thin-film magnetic head in accordance with this embodiment and conventional thin-film magnetic heads, which test was conducted to prove that structure of this embodiment would enable an improvement in the abrasion resistance of the thin-film magnetic head. FIG. 4 shows the abrasion losses of head samples A to D caused by this test. The head A is a thin-film magnetic head having a substrate formed of Ni-Zn ferrite, the head B is the head in accordance with the embodiment of the present invention, the head C is a conventional thin-film magnetic head having a substrate formed of crystallized glass consisting of an aggregation of microcrystalline grains having an average crystal grain size of 0.5 to 1.0 $\mu$m, and the head D is a conventional thin-film magnetic head having a substrate formed of crystallized glass consisting of an aggregation of microcrystalline grains having an average crystal grain size of 0.2 to 0.5 $\mu$m. The abrasion losses are expressed as ratios relative to that of the head having the Ni-Zn ferrite substrate.

As can be understood from FIG. 4, the abrasion loss of the head B in accordance with the embodiment of the present invention is remarkably smaller than those of the heads C and D having the substrates formed of conventional crystallized glasses, and is about ¾ of the abrasion loss of the conventional head A having the Ni-Zn ferrite substrate. As a result of the abrasion resistance test, it was also confirmed that the extent of one-sided abrasion of the medium slide surface of the head in accordance with the present invention was small, and that the damage of the recording medium caused by this one-sided abrasion was small.

Although clusters α are crystallized in the crystallized glass of the thin-film magnetic head in accordance with the present invention, this glass can be worked in the head manufacture process with improved workability because it is basically an aggregation of microcrystalline grains. It is, therefore, possible to manufacture high-precision thin-film magnetic heads at an improved yield.

If, in the construction of the thin-film magnetic head, the difference between the thermal expansion coefficients of the material of the substrate and the magnetic material forming the magnetic core is large, a serious problem is encountered in that the thermal stress in the head is increased in the heating step of the head manufacture process (for annealing or bonding of the protective plate), which stress may deteriorate the magnetic characteristics or cause cracking or separation of the magnetic layers.

To avoid these problems, in the thin-film magnetic head in accordance with the above-described embodiment of the present invention, Sendust (having a thermal expansion coefficient of $140 \times 10^{-7} \deg^{-1}$) is used for the magnetic layers 2 and 7 while the thermal expansion coefficient of the crystallized glass of the substrate 1 is set $135 \times 10^{-7} \deg^{-1}$ (room temperature to 600° C.) which is substantially equal to that of the Sendust. It is thereby possible to avoid the problems owing to the difference between the thermal expansion coefficients, thereby ensuring that thin-film magnetic heads improved in reliability can be manufactured at a low cost.

Permalloy or amorphous magnetic materials ordinarily used as magnetic materials for forming magnetic layers of magnetic cores of thin-film magnetic heads have a thermal expansion coefficient of $110 \times 10^{-7}$ to $140 \times 10^{-7} \deg^{-1}$. The crystallized glass having the above thermal expansion coefficient can be suitably used as a material of a substrate for thin-film magnetic heads having magnetic core layers formed of such metallic magnetic materials.

As is clear from the above explanation, in the thin-film magnetic head having the magnetic core formed by the thin-film deposition technique on the substrate formed of crystallized glass, the crystallized glass forming the substrate consists of a mass of microcrystalline aggregation particles having an average particle size of 1 to 10 μm and each consisting of an aggregation of microcrystalline grains having an average grain size of about 0.5 μm or smaller. This structure enables an improvement in the abrasion resistance of the head and, hence, an improvement in the recording/reproduction characteristics while maintaining the desired workability of the substrate, thereby improving the head in producibility and reliability.

What is claimed is:

1. A thin-film magnetic head comprising:
   (a) a substrate; and
   (b) a magnetic core formed on said substrate, said magnetic core being constituted by magnetic thin films,
   wherein said substrate is formed of crystallized glass containing a multiplicity of microcrystalline aggregation particles having an average particle size of 1 to 10 μm and each being formed of an aggregation of microcrystalline grains having an average grain size of about 0.5 μm or smaller.

2. A head according to claim 1, wherein a thermal expansion coefficient of said crystallized glass corresponds to a thermal expansion coefficient of a magnetic material forming said magnetic thin films.

3. A head according to claim 2, wherein the thermal expansion coefficient of said crystallized glass is $110 \times 10^{-7}$ to $140 \times 10^{-7} \deg^{-1}$.

4. A head according to claim 3, wherein said magnetic thin films are formed of Sendust, and the thermal expansion coefficient of said crystallized glass is close to $140 \times 10^{-7} \deg^{-1}$.

5. A head according to claim 3, wherein said magnetic thin films are formed of permalloy.

6. A head according to claim 1, wherein said crystallized glass further contains amorphous layers positioned between said multiplicity of microcrystalline aggregation particles.

7. A head according to claim 1, wherein said crystallized glass contains alumina silicate glass as a main component.

* * * * *